B. F. SWEENEY.
SELF TIER FOR HAY PRESSES.
APPLICATION FILED AUG. 10, 1909.

949,857.

Patented Feb. 22, 1910.
6 SHEETS—SHEET 6.

WITNESSES:

INVENTOR
B. F. Sweeney.
BY
Attorney

UNITED STATES PATENT OFFICE.

BENJAMIN FRANKLIN SWEENEY, OF NEOSHO, MISSOURI.

SELF-TIER FOR HAY-PRESSES.

949,857.

Specification of Letters Patent. Patented Feb. 22, 1910.

Application filed August 19, 1909. Serial No. 513,504.

*To all whom it may concern:*

Be it known that I, BENJAMIN F. SWEENEY, a citizen of the United States, residing at Neosho, in the county of Newton and State of Missouri, have invented certain new and useful Improvements in Self-Tiers for Hay-Presses; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in automatic bale tying apparatus and comprises various details of construction, combinations and arrangements of parts which will be hereinafter fully described and then specifically defined in the appended claims.

I illustrate my invention in the accompanying drawings, in which:—

Fig. 5 is an enlarged vertical section through the tying box. Figs. 16 and 17 are detail views.

Reference now being had to the details of the drawings by numeral, 1 designates the frame of the apparatus mounted upon suitable wheels 2, and 3 designates a press box and 4 a hopper in which the material to be pressed is fed. The plunger of the baling press, which in the present instance is not shown, may be of any shape and adapted to move underneath the hopper and to reciprocate within the press box.

Figure 4:
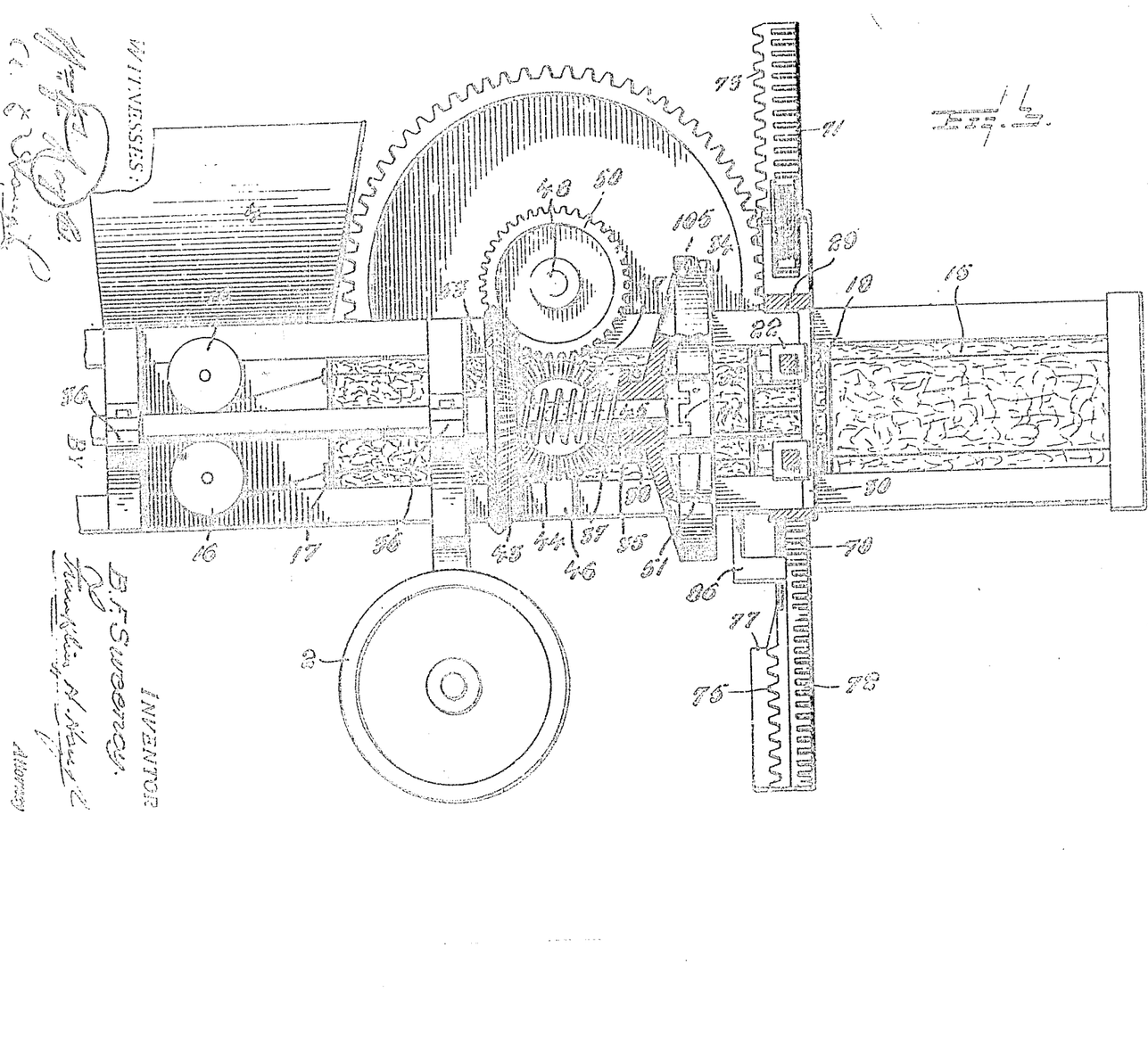
Fig. 4 is a view taken on line 4—4 of Fig. 1, looking in the direction of the arrow.
Figure 6:
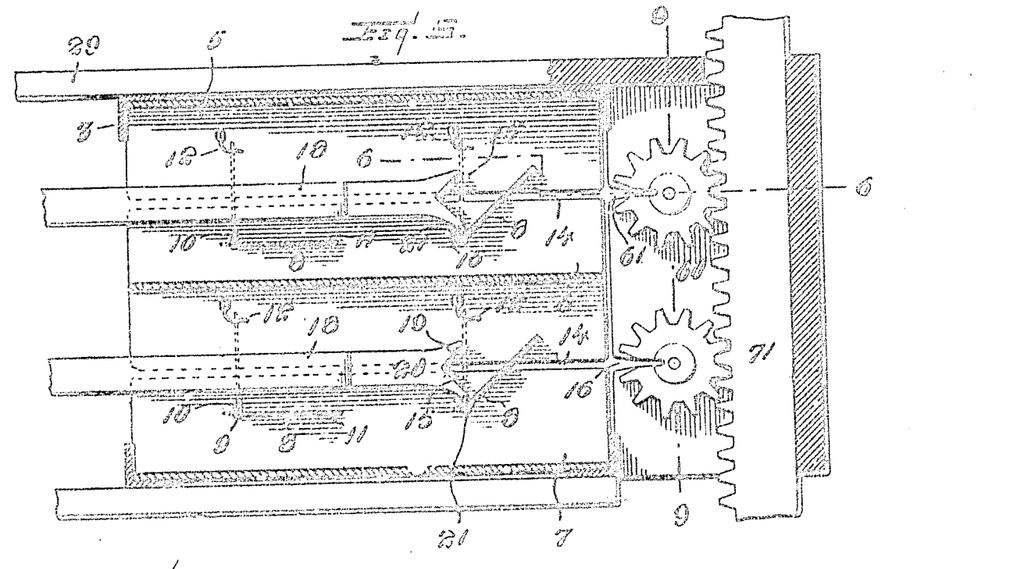
Fig. 6 is a sectional view on line 6—6 of Fig. 5.
Figure 7:
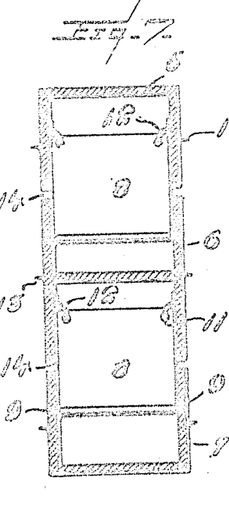
Fig. 7 is a cross sectional view through the tying box.

A block in which the needles are adapted to move is made up of three sections, designated respectively by numerals 5, 6 and 7, shown in section in Figs. 5 and 7 of the drawings. Said block has two gates 8 pivotally mounted in the lower section and two in the intermediate section 6, as shown clearly in Figs. 5 and 7 of the drawings, and each of said gates has pintles 9 which are mounted in the opposite walls of the sections in which they are mounted. Each of said gates has a flange 10 projecting at right angles therefrom adjacent to its pivotal points and adjacent to their free ends are the apertures 11 adapted, when the gates are positioned as shown in Fig. 7 of the drawings, to receive the hooks 12 which are fastened to the opposite walls of their respective sections. When the gates are engaging the hooks as shown in Fig. 7, the three sections of the block are held together and, when the gates are thrown down to the position shown in solid lines in Fig. 5 for the purpose of allowing the needles to move therethrough, the sections are held in their proper relative position by means of the spikes 13 which project from the sides of the sections and are adapted to engage the hay upon either side and assisted also by the pressure of the hay bearing against the sides of said sections. Each of said sections, it will be noted, has a space 14 intervening between the adjacent edges and through which spaces the tie wires 15 are adapted to pass. Said tie wires, which are adapted to unwind from the reels 16 journaled upon the opposite sides of the frame, as shown clearly in Figs. 2 and 3 of the drawings, pass through the eyelets 17 upon either side of the press box and their forward ends are fastened together across the line of travel of the bale and adapted to be engaged by the first bale which is formed. The tying needles, designated by numeral 18, are adapted to have longitudinal movements within the spaces intermediate the sections of the block as described and each needle has a forked end, each arm 20 of which is forked, as at 19 and at the lower portion of each notched end is formed a hook 21 adapted to engage the flange 10 upon the gate for the purpose of throwing the same to a vertical position when the needle is retracted. The shank portion of each needle is adapted to have a longitudinal movement in a guide boxing 22 and their outer ends are fastened to a cross-piece 23 which has an aperture 24 therein to which one end of the cable 25 is connected. A pulley 26 is journaled upon a spindle 27 mounted in suitable bearings in the depending bracket arms 28 of the strip 29, which latter is fastened to the cross-pieces 30, forming a portion of the frame of the needle carrying apparatus. A pitman 31 is pivotally connected to a pin 32 which is fastened to the cross-piece 23 and its other end pivotally connected to a pin 33 which is fastened to the wheel 34 loosely mounted upon a shaft 35, as shown clearly in Fig. 4 of the drawings. The shaft 35 is journaled in bearings 36 in the frame of the apparatus and 37 is a grooved hub to said shaft in the groove of which a clutch ring 38 is mounted, which ring has a shank portion bent to form a crank shaft 39, shown in Fig. 1 of the drawings, which is journaled to rock in the bearings 40 at one end 41 and said rod is bent at an angle as at 42 and is adapted to be positioned in the path of a bale movable through the press box. A beveled pinion 43 is mounted upon the shaft 35 and is adapted to rotate therewith and is in mesh with a beveled pinion 44 fixed to a stub shaft 45 which is mounted in suitable bearings 46 underneath the shaft 48, which latter is journaled in boxes 49. A gear wheel 47, shown in Fig. 16 of the drawings, rotates with the beveled pinion 44 which is fixed to the shaft 45 and is in mesh with a gear wheel 50, which latter is fixed to the shaft 48. A clutch collar, designated by numeral 51, is fixed to the shaft 35 and is adapted to engage the clutch teeth 52 upon the hub of the wheel 34. A spring, designated by numeral 53, is mounted upon the shaft 35 and bears between the pinion 43 and the hub 37 of the wheel 34 and serves to normally hold the clutch teeth 52 in mesh with the clutch 51. A second clutch, designated by numeral 54, is fixed to the shaft 48 and has teeth 55 designed to intermesh with the teeth 56 upon the hub 57 of the gear wheel 58. A spring 59 is interposed between the clutch 54 and the hub 57 and serves to normally hold the same out of mesh with each other.

Figure 8:
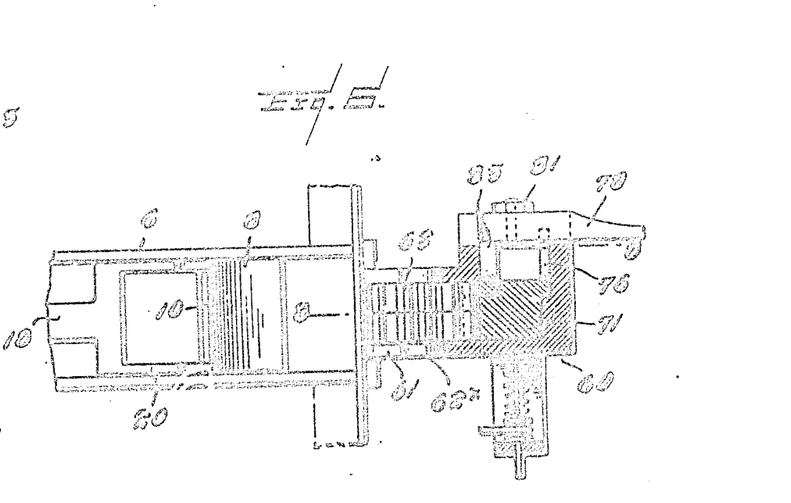
Fig. 8 is a sectional view on line 8—8 of Fig. 6.
Figure 9:
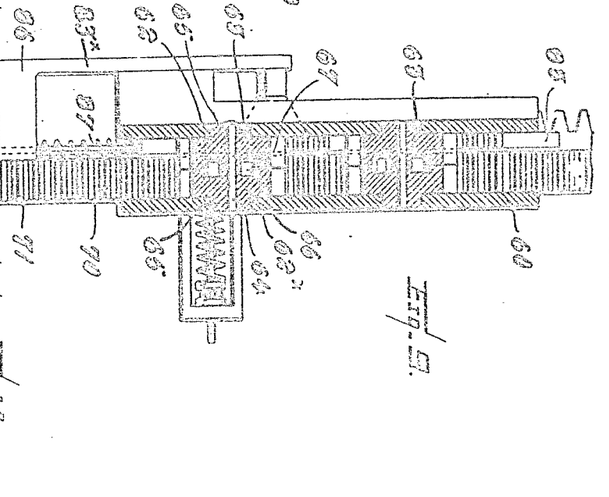
Fig. 9 is a sectional view on line 9—9 of Fig. 5.
Figure 10:
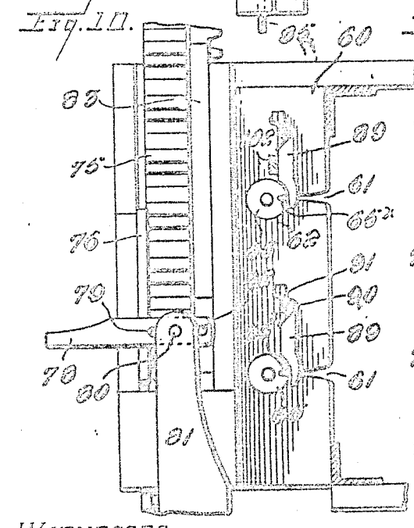
Fig. 10 is a side elevation of a portion of the frame of the apparatus showing parts in elevation.

Referring to Figs. 5 and 8 of the drawings will be seen a boxing 60 having two horizontally disposed slots 61 formed in one edge thereof and each of said slots terminates in a circular outlined bearing 62, shown clearly in Figs. 9 and 10 of the drawings, and said bearings are opposite each other in the walls of the boxing. 62ˣ and 63 designate twisting wheels mounted upon a common pivotal pin 64 which passes through the spindle ends 65 of said wheels, which latter are journaled in the circular outlined bearings, as shown clearly in the drawings. Each of said wheels 62ˣ and 63 has a circular outlined recess 66 formed in its inner face and 67 designates a curved spring which is mounted in the two recesses formed in the adjacent faces of the wheels 62ˣ and 63. It will be noted that each of said springs has a slight play within the recesses, said spring being provided for the purpose of allowing one wheel which is held against the face of the other to have a slight axial movement sufficient to cause the two edges of the slots to shear against each other and sever a wire and afterward be returned to their normal positions with their radial slots 68 registering with the slots 61 in the wall of the boxing. Each of said wheels which are arranged in pairs, as shown clearly in Figs. 8 and 9 of the drawings, is provided with teeth 69 which are adapted to be engaged by the teeth 70 upon the rack bar 71. It will be noted upon reference to Figs. 11 and 12 of the drawings that said rack bar 71 is provided with a second series of teeth, designated by numeral 72, and each shorter than the teeth 70 above for the purpose of causing each outer wheel 62ˣ of each set to rotate independent of its adjacent wheel during a certain operation of the apparatus. It will also be noted that the rack bar 70 is provided with a broken series of gear teeth, designated in the drawings by numeral 73, which are on a face of the rack bar at right angles from which the teeth 70 project. In said broken series a recess 74 is formed having no teeth upon the edge thereof, as shown clearly in Figs. 11 and 12 of the drawings, the lower portion of the series being designated by numeral 75. Projecting from the series of teeth 73 is a guard strip 76 to cause the wheel 58 to mesh with the teeth 73 excepting when the untoothed portion of said rack bar comes adjacent to the teeth of the wheel 58 at which time the rack will be momentarily at rest for a purpose which will presently appear. The lower portion of the recess 74 terminates in a shoulder or stop 77 adapted to tilt a lever 78 as the rack bar moves upward. The lever 78 has a slot 79 formed therein adapted to receive a pin 80 rising from the bracket arm 81 and at the inner end of said lever is pivotally mounted a pin 82 fixed to a longitudinally movable rack bar 83, shown clearly in Fig. 8 of the drawings. Said rack bar 83 has two series of teeth, each series being designated by numeral 84. In the drawings there are three teeth shown in each of said series and each is adapted to simultaneously mesh with the teeth of the inner wheels 63 to cause the same to make a partial rotary movement independent of the wheels 62ˣ for the purpose of causing the edges of the slots therein to shear and cut the wire after the same has been twisted together in the manner shown in Fig. 15 of the drawings. The lower end of the rack bar 83 has a contracted portion 85 adapted to be guided in an aperture in a depending arm 83ˣ of the frame and a spring 87 bears intermediate the projection 86 and the shoulder 88, the office of said spring being to return the rack bar 83 to its uppermost position after having been drawn down by the tilting of the lever 78 as the shoulder 77 comes in contact therewith.

It will be noted upon reference to Fig. 10 of the drawings that the spindle end 65 of the wheels 62* and 63 has a radial slot 65* which is adapted to register with the slots 61 and 68 and to receive and hold the wires to be twisted. A wire retaining finger 89 is pivotally mounted upon a pin 90 upon the sides of the section of the boxing 60 and a spring 91 serves to yield to allow the wire to be inserted in said slot and retain the same during the twisting of the wire.

Figures 1, 15:
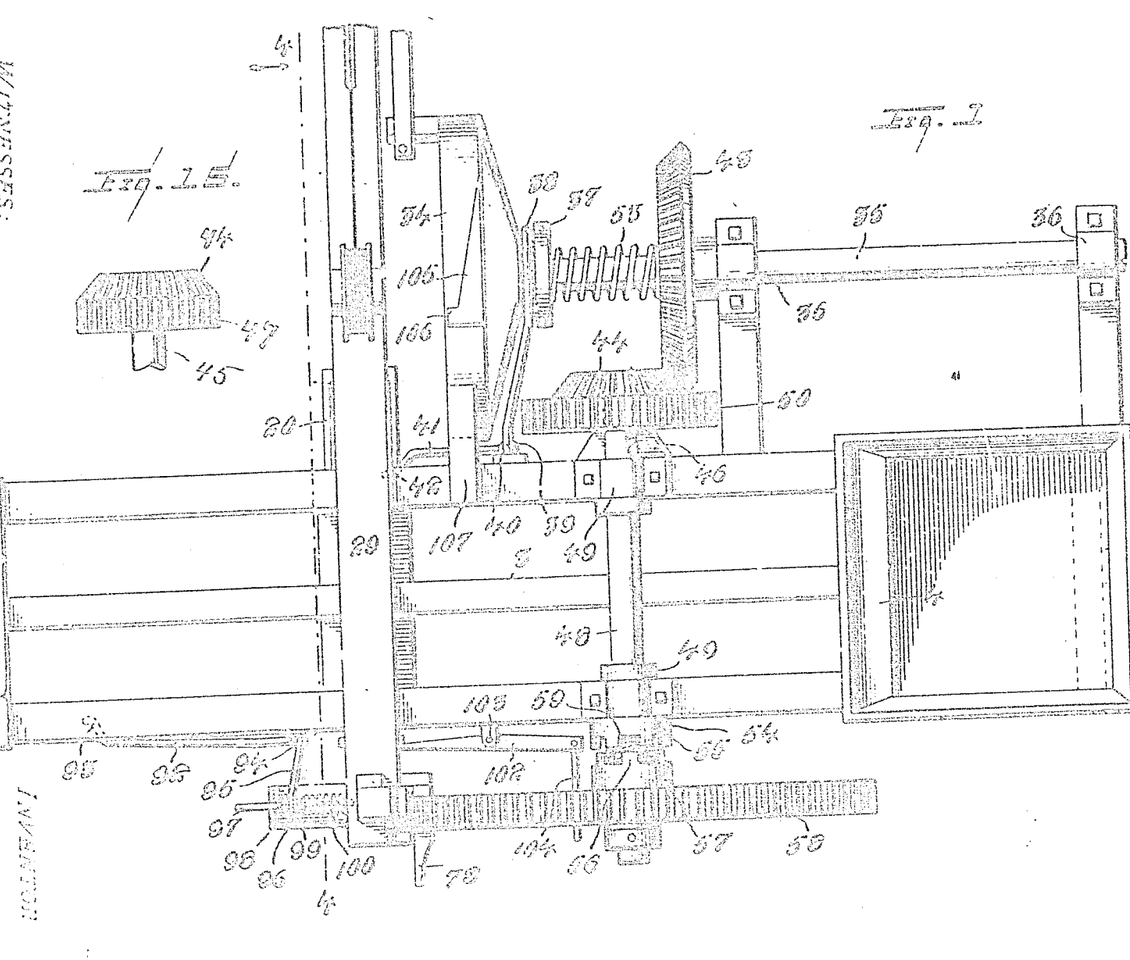
Figure 1 is a top plan view of my tying apparatus.
Fig. 15 is an enlarged detail view of a pair of the twisting wheels.
Figures 2, 3:
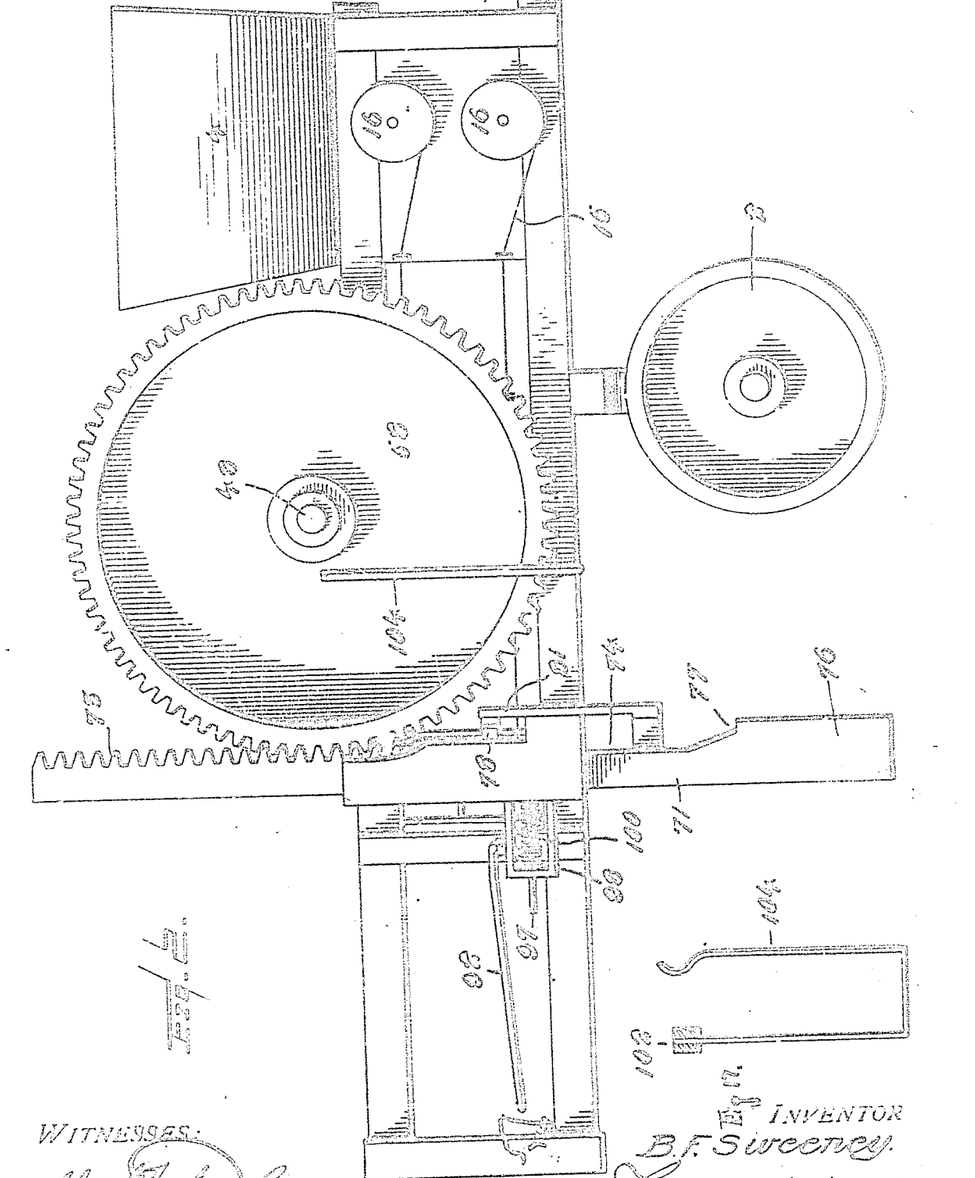
Fig. 2 is a side elevation of the apparatus.
Fig. 3 is a central longitudinal section through a portion of the apparatus, parts being shown in elevation.

Referring to Figs. 1 and 2 of the drawings will be seen a rod 92, one end 93 of which is adapted to project within the ejector end of the press box and said rod 92 is bent to form a crank shaft which is journaled in the bearing 94 and provided with an arm 95 bent to form an eye 96 through which a pin 97 passes. Said pin is mounted in an aperture in the bracket arm. 98 and 99 designate collars which are fixed to the pin 97, and 100 is a coiled spring mounted upon the pin 97 and interposed between one of said collars and the boxing 60. The inner end of the pin 97 is adapted to engage a slot or hole 101 formed in the rack bar 71, as shown clearly in Fig. 4 of the drawings.

Referring to Fig. 1 of the drawings will be seen a lever 102 pivotally mounted upon a pivot 103, and 104 designates a rod which is bent, as shown in Fig. 17 of the drawings, and passes underneath the wheel 58 and designed, as the lever 102 is tilted upon its pivot, to throw the wheel 58 into gear with the clutch collar 54, it being understood that the clutch collar 54 and the shaft 35 are continuously rotating and that the wheels 58 and 34 are only rotating at predetermined moments for the purpose of tying the bales.

Projecting from the circumference of the wheel 34 is a cam 105 terminating in a stop or shoulder 106 and projecting from the press frame is a finger 107 positioned in the path of said cam projection 105 when the wheel 34 is in gear with the clutch collar 54.

In operation, the ends of the wires, two upon either side of the press box, are brought together and twisted in the forward end of the press box. The hay or other commodity to be baled is inserted in the hopper and compressed in the usual manner by means of a plunger, after which a sectional block carrying the gates is inserted in the press box and moved forward by the plunger to a position in alinement with the needles. When it is desired to cause the bale to be tied by the wires and after the first bale of hay has passed by the inner end 42 of the rocking shaft 40, the spring 53 will throw the wheel 34 to the right, causing the clutch teeth upon the hub thereof to engage the clutch collar 54 and cause said wheel 34 to rotate with the shaft 35. As the wheel 34 rotates, the pitman connected thereto will cause the needles to be moved forward within the sectional block, each pair pushing the baling wire forward in the recess intermediate the sections of the blocks and into the slots 61 of the boxing 60 and also the registering slots in the wheels 62* and 63. As the wires come in contact with the pivotal fingers 89, the latter will yield and allow the wire to pass into the registering slots in the spindle ends of the wheels 62* and 63, after which, when the wheels with the wires engaging the slots as described make a partial rotary movement, the fingers 89 will be returned to their normal positions by means of the springs bearing against the same and hold the wires within the slots while they are being twisted together. As the inner end of the upper of said needles comes in contact with the free end of the lever 102, the latter will be tilted upon its pivot and the arm 104 connected thereto will be thrown against the outer face of the wheel 58 and cause the clutch teeth upon the hub thereof to be thrown into mesh with the teeth upon the clutch collar 54 which is fixed to the shaft 48, thereby causing the wheel 58 to rotate with the shaft 48. It will be noted that the spring 59 intermediate the clutch collar 54 and the hub 57 will be put under tension as they come together. As the wheel 58 rotates, the rack bar 71 in mesh with the teeth thereof will be raised and, as a set of teeth upon said rack bar is in mesh with the teeth of said wheels 62* and 63, the latter will be caused to rotate and twist the strands of the wire together in the manner shown in Fig. 15 of the drawing. After the wires have been sufficiently twisted together, the teeth of the wheel 58 will have come opposite the toothless recessed portion 74 of the rack bar and further twisting of the wires will be arrested.

Figures 11, 12:
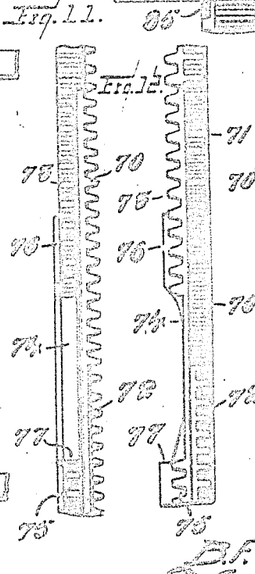
Figs. 11 to 14 inclusive are detail views of segment gears.
Figure 13:
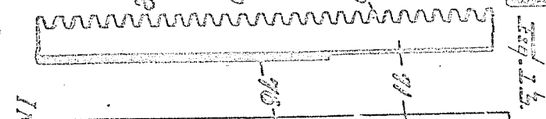
Figure 14:
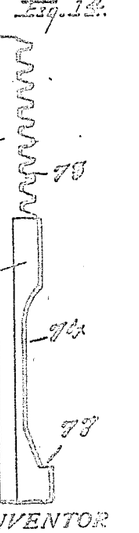

When the wires have been sufficiently twisted together and when the lowermost of the wide rack teeth 70, shown clearly in Fig. 12 of the drawings, passes by the wheels 62* and 63, the narrow gear teeth 72 will still be in mesh with the teeth of the outer wheels 62* and cause the same to rotate independently of the wheels 63 and, simultaneously with the independent movement of the wheels 62*, the shoulder 77 upon the rack bar will have come in contact with the lever 78 and cause the same to tilt upon its pivot 80 and cause the rack bar 83 to be thrown down. As the series of teeth 84 upon the rack bar 83 mesh with the wheel 63, the latter will be given a partial rotary movement in a reverse direction from the rotary movement being imparted to the wheel 62* by the teeth 72 of the rack bar 71 as the latter moves upward. These reverse motions imparted to the wheels 62* and 63 momentarily serve to cause a shearing effect intermediate the edges of the registering slots therein for the purpose of severing the wires that have been twisted. As the rack bar 71 reaches its highest limit, the slot 101 therein will come in registration with the end of the spring-pressed pin 97 and the latter will be forced into said slot by reason of the pressure being brought to bear upon the end 93 of the arm 92 of the rock shaft 94, as shown clearly in Fig. 1 of the drawings. This operation will hold the rack bars in suspension and also hold the wire twisting wheel until the bale of hay is ejected from the discharge end of the press and which will allow the shaft 94 to rock in its bearings and assume the position shown in Fig. 1 of the drawings, the spring 100 throwing the pin 97 out of the slot 101. When the wheel 34 with the cam projection upon the edge thereof approaches a complete revolution and after the needles have pushed the wire into the twisting wheels and simultaneously with the rotating of the wheels in the act of twisting the wires, the wheel 34 will have partially completed a revolution, causing the needles to be withdrawn from the sectional block and, as the cam projection upon the wheel 34 comes in contact with the stop 107, the wheel 34 will have been thrown out of gear by being moved laterally against the tension of the spring 53. When the wheel 34 comes to a stop, a shoulder upon said cam projection will be held from further forward rotary motion by means of the stop 107. The bale being pressed bearing against the inner end 42 of the lever 41 will cause the wheel 34 to be pushed laterally a short distance, sufficient to allow the stop at the end of the cam projection to free the edge of the stop 107. As the needles are withdrawn, the cord 25, which, upon the forward movement of the needles into said sectional blocks, has been unwinding from the spring-pressed reel upon the bar 29, will automatically wind up and, when the needles nearly approach their outer limits, the tension of the spring which winds up the rope 25 will cause a partial revolution to be imparted to the wheel 38, which latter being out of mesh with the clutch collar upon the shaft 85 will allow the wheel 34 to return to its normal position. As the upper needles are withdrawn from the sectional block and away from the tilting lever 102, the latter will tilt upon its pivot and the spring 59 intermediate the clutch collar 54 and the hub 57 upon the gear wheel 58 will cause the wheel 58 to be thrown out of gear. As the bale of hay moves out of the discharge end of the press frame and pressure is relieved from the end 93 of the arm 92, shown clearly in Fig. 1 of the drawings, the spring 100 will cause the pin 97 to be withdrawn from the slot 101 in the rack bar, thus allowing the latter to fall by gravity to its lowest position and in said movement, when the teeth 70 of the rack bar come in contact with the gear teeth of the wheel 58, the latter will turn idly upon the shaft 48. As the shoulder 77 of the rack bar frees the lever 78, the latter will return to its normal position and also the rack bar to which it is pivoted and the springs 67 will return the wheels 62 to their normal position with the slots in registration with each other. As the needles withdraw from the sectional block, the pivotal gates mounted within said block will be thrown back to their normal positions by means of the hooked ends 21 of the needles coming in contact with the flanges 10 of the gates, causing the latter to swing to the position shown in dotted lines in Fig. 5 in which positions said gates will be engaged by the hooks 12 and serve to hold the sections of the blocks together, it being understood that the sections of the blocks are held together when the gates are thrown open jointly by the spikes 13 which project from the opposite sides of the sections and also the pressure of the hay or other commodity being baled against the sides of the same. While the bale is being tied, a new bale is being compressed and a duplicate sectional block being placed within the press and moved forward and made to follow the one being utilized for tying the bale immediately in advance thereof. This operation is repeated, parts working automatically and the bales ejected simply from the discharge end of the press.

What I claim to be new is:—

1. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, and means for operating the apparatus.

2. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, a sectional block with spaces intermediate the sections and through which needles are adapted to move, and means for operating the apparatus.

3. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, a sectional block with spaces intermediate the sections and through which needles are adapted to move, detachable means for holding the sections of the block together, said needles adapted to release said detachable means as they move within the block, and mechanism for operating the apparatus.

4. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, a sectional block mounted within the press frame and through which the needles are adapted to work, gates pivoted within the sections of the block, means coöperating therewith for holding the sections of the block spaced apart, said needles adapted to detach the connections between the sections of the block as they are moved forward, and means for operating the apparatus.

5. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, a sectional block mounted within the press frame and through which the needles are adapted to work, gates pivoted within the sections of the block, means coöperating therewith for holding the sections of the block spaced apart, said needles adapted to detach the connections between the sections of the block as they are moved forward, means actuated by the withdrawal of the needles from the sections for connecting the latter, and mechanism for operating the apparatus.

6. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, a sectional block mounted within the press frame and through which the needles are adapted to work, pivotal gates mounted upon sections of the block and provided with apertures, hooks upon the adjacent sections of the block adapted to engage the apertures in said gates, the latter being disconnected from said hooks by the forward movements of the needles and returned to their locked positions upon the outer throw of the needles, and means for operating the apparatus.

7. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, mechanism for rotating said wheels for twisting the wire, mechanism for moving one wheel independent of the other for cutting the wires, a sectional block mounted within the press frame and through which the needles are adapted to work, pivotal gates mounted upon sections of the block and provided with apertures, hooks upon the adjacent sections of the block adapted to engage the apertures in said gates, the latter being disconnected from said hooks by the forward movements of the needles, a projection upon each gate adapted to be actuated by the fingers to return the gates to their locking position upon the outer throw of the needles, and means for operating the apparatus.

8. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, means for moving one wheel of each set independent of the other and in opposite directions one to the other for severing the wires, and means for operating the apparatus.

9. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, means for moving one wheel of each set independent of the other and in opposite directions one to the other for severing the wires, means for returning the slotted wheels to their normal positions after having been moved in reverse directions for severing the wires, and mechanism for operating the apparatus.

10. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, a second rack bar, means for moving the same to actuate one slotted wheel in each set independent of the other wheel for the purpose of severing the wires being twisted, and means for operating the apparatus.

11. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, a second and spring-actuated rack bar adapted to engage and move one wheel in each set in a reverse direction for the purpose of severing the wires being twisted, means for moving said second rack bar against the tension of the spring bearing against the same.

12. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, a second and spring-actuated rack bar having intermittent series of teeth thereon adapted to engage one notched wheel in each of said sets, a pivotal lever upon the frame of the apparatus having pivotal connection with said second rack bar, and means for tilting said lever as the first referred to rack bar reaches its highest limit.

13. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, a second and spring-actuated rack bar having intermittent series of teeth thereon adapted to engage one notched wheel in each of said sets, a pivotal lever upon the frame of the apparatus having pivotal connection with said second rack bar, said second-referred to rack bar having a shoulder adapted to contact with said lever to tilt the same at a predetermined moment to cause a wheel in each set to be moved in a reverse direction for severing the wires being twisted.

14. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a rack bar and means for moving the same to cause said slotted wheels to rotate in unison to twist the wires together, a second and spring-actuated rack bar having intermittent series of teeth thereon, a spring adapted to normally hold the latter at its highest throw, a lever pivoted upon the frame and having pivotal connection with said second referred to rack bar, a shoulder upon the first referred to rack bar adapted to tilt said lever to cause said intermittent series of teeth to rotate one wheel in each set for the purpose of severing the wire being twisted.

15. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a vertically disposed rack bar having a plurality of series of teeth upon adjacent faces thereof, one of said series adapted to engage the teeth of said wheels and a gear wheel meshing with the other series of teeth, means actuated by a needle for throwing said wheel into gear, a second rack bar adapted to rotate one wheel in each of said sets in a reverse direction for the purpose of severing wires being twisted, a pivotal lever connected to said second rack bar adapted to be actuated by a shoulder upon the first mentioned rack bar.

16. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a vertically disposed rack bar having a plurality of series of teeth upon adjacent faces thereof, one of said series adapted to engage the teeth of said wheels and a gear wheel meshing with the other series of teeth, a driving shaft, a clutch collar fixed thereto, a gear wheel fixed to said shaft and upon which shaft said gear wheel is mounted, a lever adapted to be tilted by the movement of one of said needles, and mechanism actuated by one of said needles for moving said gear wheel into mesh with said clutch collar.

17. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a vertically disposed rack bar having a plurality of series of teeth upon adjacent faces thereof, one of said series adapted to engage the teeth of said wheels and a gear wheel meshing with the other series of teeth, a driving shaft, a clutch collar fixed thereto, a gear wheel fixed to said shaft and upon which shaft said gear wheel is mounted, a lever adapted to be tilted by the movement of one of said needles, a rod fixed to said lever and bent about said gear wheel and adapted, as the lever is tilted, to move the gear wheel in mesh with the clutch collar upon said shaft.

18. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a vertically disposed rack bar having a plurality of series of teeth upon adjacent faces thereof, one of said series adapted to engage the teeth of said wheels and a gear wheel meshing with the other series of teeth, a driving shaft, a clutch collar fixed thereto, clutch teeth upon the hub of said gear wheel, a spring interposed between said hub and clutch collar for normally holding the same out of mesh, a lever adapted to be tilted by one of said levers, a gear throwing clutch fixed to said lever and having an arm bent adjacent to the outer face of said gear wheel and adapted to move the same against the tension of the spring as the lever tilts upon its pivot.

19. An automatic tying apparatus for baling presses, comprising, in combination with the press frame, a boxing, toothed wire twisting wheels, arranged in pairs, mounted therein and having registering slots for the reception of wires to be twisted, a sectional block within the press frame, needles movable within the sections of said block and adapted to move the baling wires in said slots, means for retaining the wires within said slots, a vertically disposed rack bar having a plurality of series of teeth upon adjacent faces thereof, one of said series adapted to engage the teeth of said wheels and a gear wheel meshing with the other series of teeth, means actuated by a needle for throwing said wheel into gear, a second rack bar adapted to rotate one wheel in each of said sets in a reverse direction for the purpose of severing wires being twisted, a pivotal lever connected to said second rack bar adapted to be actuated by a shoulder upon the first mentioned rack bar, and means for holding said rack bar in mesh with the gear wheel.

20. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, a positively driven operating shaft mounted in said frame, a clutch collar fixed to said shaft, a loosely journaled spring-actuated wheel mounted upon said shaft and having clutch teeth adapted to engage said clutch collar, a pitman connected to said spring-actuated wheel, a cross-piece connecting the shank portions of said needles and to which said pitman is connected, a cable fastened to said cross-piece, a pulley over which the cable moves, a spring-actuated pulley upon which the cable winds, automatic means for throwing said spring-actuated wheel out of mesh, rack bars, and means for operating the same to cause said wire twisting wheels to operate, 21. An automatic tying apparatus for baling presses, comprising, in combination with the press frame, a boxing, toothed wire twisting wheels, arranged in pairs, mounted therein and having registering slots for the reception of wires to be twisted, needles for moving the wires into said slots, a positively driven operating shaft mounted in said frame, a clutch collar fixed to said shaft, a loosely journaled spring-actuated wheel mounted upon said shaft and having clutch teeth adapted to engage said clutch collar, a pitman connected to said spring-actuated wheel, a cross-piece connecting the shank portions of said needles and to which said pitman is connected, a cable fastened to said cross-piece, a pulley over which the cable moves, a spring-actuated pulley upon which the cable winds, automatic means for throwing said spring-actuated wheel out of mesh, vertically disposed rack bars having teeth in mesh with the teeth of said wire twisting wheels, a positively driven counter shaft in gear with said operating shaft, a collar fixed to said counter shaft, a gear wheel loosely journaled thereon and adapted to mesh with the teeth of the rack bar, a pivotal lever adapted to be actuated by one of said needles to throw said gear wheel upon the counter shaft in mesh with the clutch collar thereon.

In testimony whereof I hereunto affixed my signature in the presence of two witnesses.

BENJAMIN FRANKLIN SWEENEY.

Witnesses:
P. H. KELLY,
J. H. RENTFRO.